United States Patent Office 3,585,057
Patented June 15, 1971

---

3,585,057
LEAD PHOSPHATE OPTICAL GLASS
Walter Jahn, Ingelheim, Germany, assignor to JENaer Glaswerk Schott & Gen., Mainz, Germany
No Drawing. Filed Aug. 31, 1967, Ser. No. 664,620
Claims priority, application Germany, Sept. 8, 1966, J 31,733
Int. Cl. C03c 3/16
U.S. Cl. 106—47          6 Claims

ABSTRACT OF THE DISCLOSURE

Novel optical flint glass compositions on a lead phosphate basis and a method of making the same are disclosed. The compositions comprise the following ingredients: 20 to 60 wt. percent lead oxide (PbO), 30 to 70 wt. percent $P_2O_5$, and 7.2–11 wt. percent of at least one of the oxides of magnesium, calcium, strontium, barium and aluminum. The glass compositions are chemically resistant, resistant to devitrification, stable to weathering and corrosion and have the desired transmission in the short wave length blue range of the spectrum.

---

The invention relates to optical glass and more particularly to optical flint glass on a lead phosphate basis.

The partial dispersions of flint glass containing lead phosphate differ decidedly from silicate-base glasses in that they decrease transmission through the short wavelength blue range of the visible spectrum. In the design of optical systems, this represents an undesirable variant in the optical properties of the resulting glass. Heretofore optical flint glass production has been limited substantially to lead silicate-base glass because of their greater ease of manufacture.

It is an object of the present invention to provide multi-component flint glass compositions on a lead phosphate basis and method of making the same having the desired properties of chemical resistance, resistance to devitrification, stability to weathering and corrosion and transmission in the short-wave length blue range of the spectrum.

Another object of the invention is to provide glass compositions having the above characteristics which will have good optical properties and which may be cast, molded, annealed, fused and otherwise processed by the usual glass manipulation mechanisms usual in the art.

Still another object of the invention is the provision of flint glass compositions on a lead phosphate basis having a high transmission for visible light in the wavelength blue range of the spectrum.

Other objects and advantages of the invention will become apparent from the following description.

The glass compositions in accordance with the invention consist of the following ingredients: 24.2 to 55 wt. percent of lead oxide (PbO), 36.8 to 70 wt. percent of $P_2O_5$ and 2.5 to 10.7 wt. percent of at least one of the oxides of magnesium, calcium, strontium, barium, and aluminum.

The glass compositions may additionally contain small amounts of the conventional stabilizing agents such as for example, boric acid and the alkali oxides.

It has been found advantageous to melt the glass from a batch consisting wholly or partially of phosphates of the metal oxides and preferably in the form of the metaphosphates as for example, of lead, aluminum and alkaline earth metals.

The glasses of the invention differ from the previously known lead phosphate glasses in their relatively high content of phosphorus pentoxide. In this manner glasses having a relatively good devitrification resistance are obtained. The prior art lead phosphate glasses contain only small amounts of lead oxide, i.e., in these known glasses lead oxide is not a principal component, as it is according to the invention, but serves only to correct the optical properties, i.e., refraction which for this type of flint glass constitutes lower refractive indexes.

The following table sets forth examples of optical glass according to the invention. The components are given in percentages by weight. The optical values are also reported.

TABLE

|  | A | B | C | D | E | F | G | H | I | J | K |
|---|---|---|---|---|---|---|---|---|---|---|---|
| PbO | 39.7 | 42.8 | 55.0 | 48.8 | 48.8 | 48.8 | 55.0 | 46.5 | 29.4 | 24.2 | 25.3 |
| MgO |  |  |  |  |  |  |  |  |  | 1.2 | 7.2 |
| CaO |  |  |  |  |  |  |  | 2.2 | 1.2 | 1.3 |  |
| BaO | 2.6 | 7.8 | 2.6 |  | 10.4 | 5.2 | 5.2 |  |  |  | 7.5 |
| $Al_2O_3$ | 5.8 | 2.9 | 1.0 | 3.9 |  | 1.9 |  | 2.0 | 3.0 |  | 2.0 |
| $P_2O_5$ | 51.9 | 46.5 | 41.4 | 47.3 | 40.8 | 44.1 | 39.8 | 36.8 | 67.4 | 66.3 | 70.0 |
| $n_D$ | 1.6257 / 46.71 | 1.6403 / 44.38 | 1.7048 / 37.63 | 1.6622 / 41.47 | 1.6975 / 38.74 | 1.7217 / 40.61 | 1.7217 / 36.35 | 1.6696 / 40.32 | 1.6170 / 46.25 | 1.6076 / 46.53 | 1.6208 / 45.01 |

The glasses are more color-free than comparable lead silicate glasses and have good acid and weather resistance; their susceptibility to staining corresponds to Class 1.

The following example will further illustrate the nature of this invention and the method for preparing the novel glass compositions but the invention is not restricted to the example.

EXAMPLE

A 1000 gram batch containing 448 g. PbO; 441 g. $P_2O_5$; 52 g. BaO (in the form of the corresponding carbonates) and 19 g. of $Al_2O_3$ were placed in a crucible of refractory material (ceramic) heated to a temperature of between about 930 and 980° C. in an electric or gas heated furnace. After the batch had melted, it was clarified for one hour at about 1020–1070° C. The glass batch was stirred for about 1 hour while the furnace cooled down to about 780° C. The cooled glass was then poured at about 650–680° C. into a preheated iron mold. The glass was thereafter transferred to a lehr that had been set at a temperature of about 370° C. and was cooled at a rate of about 7° C. per hour down to room temperature.

What is claimed is:

1. An optical glass characterized in that it is resistant to chemicals, weathering, devitrification and has a high transmission of visible light in the short wavelength blue range of the spectrum, having the following composition: 39.7 wt. percent PbO, 2.6 wt. percent BaO, 5.8 wt. percent $Al_2O_3$, 51.9 wt. percent $P_2O_5$.

2. An optical glass characterized in that it is resistant to chemicals, weathering, devitrification and has a high transmission of visible light in the short wavelength blue range of the spectrum, having the following composition: 42.8 wt. percent PbO, 7.8 wt. percent BaO, 2.9 wt. percent $Al_2O_3$, 46.5 wt. percent $P_2O_5$.

3. An optical glass characterized in that it is resistant to chemicals, weathering, devitrification and has a high transmission of visible light in the short wavelength blue range of the spectrum, having the following composition: 48.8 wt. percent PbO, 3.9 wt. percent $Al_2O_3$, and 47.3 wt. percent $P_2O_5$.

4. An optical glass characterized in that it is resistant to chemicals, weathering, devitrification and has a high transmission of visible light in the short wavelength blue range of the spectrum, having the following composition: 29.4 wt. percent PbO, 1.2 wt. percent CaO, 3.0 wt. percent $Al_2O_3$ and 67.4 wt. percent $P_2O_5$.

5. An optical glass characterized in that it is resistant to chemicals, weathering, devitrification and has a high transmission of visible light in the short wavelength blue range of the spectrum, having the following composition: 24.2 wt. percent PbO, 1.2 wt. percent MgO, 1.3 wt. percent CaO, and 66.3 wt. percent $P_2O_5$.

6. An optical glass characterized in that it is resistant to chemicals, weathering, devitrification and has a high transmission of visible light in the short wavelength blue range of the spectrum, having the following composition: 25.3 wt. percent PbO, 1.2 wt. percent MgO, 1.5 wt. percent BaO, 2.0 wt. percent $Al_2O_3$, 70.0 wt. percent $P_2O_5$.

References Cited

UNITED STATES PATENTS

| | | | |
|---|---|---|---|
| 1,654,404 | 12/1927 | Blumenberg | 106—47 |
| 2,031,958 | 2/1936 | Kaufmann et al. | 106—47 |
| 2,381,925 | 8/1945 | Pincus | 106—47 |
| 2,441,853 | 5/1948 | Stanworth | 106—47 |
| 2,684,304 | 7/1954 | Weissenberg et al. | 106—47 |
| 2,723,203 | 11/1955 | Weissenberg et al. | 106—47 |
| 2,996,390 | 8/1961 | Weissenberg et al. | 106—47 |

FOREIGN PATENTS

| | | | |
|---|---|---|---|
| 1,805,719 | 1955 | France | 106—47 |

HELEN M. McCARTHY, Primary Examiner

UNITED STATES PATENT OFFICE
CERTIFICATE OF CORRECTION

Patent No. 3585057                         Dated June 15, 1971

Inventor(x) Walter Jahn

It is certified that error appears in the above-identified patent and that said Letters Patent are hereby corrected as shown below:

Col. 1, line 3, the name of assignor should be
-- JENAer-- and not "JENaer";

line 17, "7.2-11" should be -- 1.2-11 --;

line 41, "short wave-length" should be -- short-wave length-- line 49, "multi-component" should be -- multiple-component --.

Col. 2, in the table under the heading "K" 4th item down

"7.5" is shown as -- 1.5 --;

line 64, "wavelength" should be -- wave length --.

Col. 3, line 3, "wavelength" should be -- wave length --;

line 9, "wavelength" should be -- wave length --;

line 15, "wavelength" should be -- wave length --;

line 21, "wavelength" should be -- wave length --.

Col. 4, line 3, "wavelength" should be -- wave length --.

line 4, the reference to French Patent should be

"1,085,719" and not -- 1,805,719 --.

Signed and sealed this 7th day of December 1971.

(SEAL)
Attest:

EDWARD M. FLETCHER, JR.        ROBERT GOTTSCHALK
Attesting Officer              Acting Commissioner of Patents